Dec. 2, 1930.  S. C. HATFIELD  1,783,469
RESILIENT DISK WHEEL
Original Filed May 31, 1922
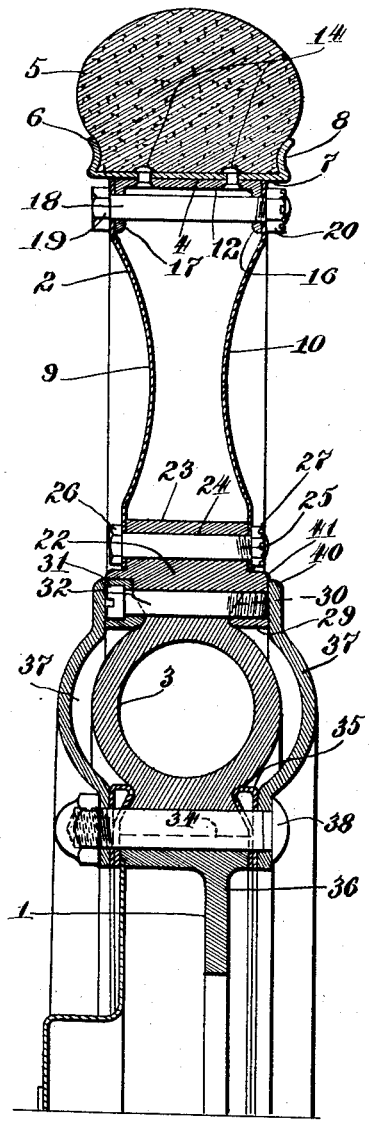
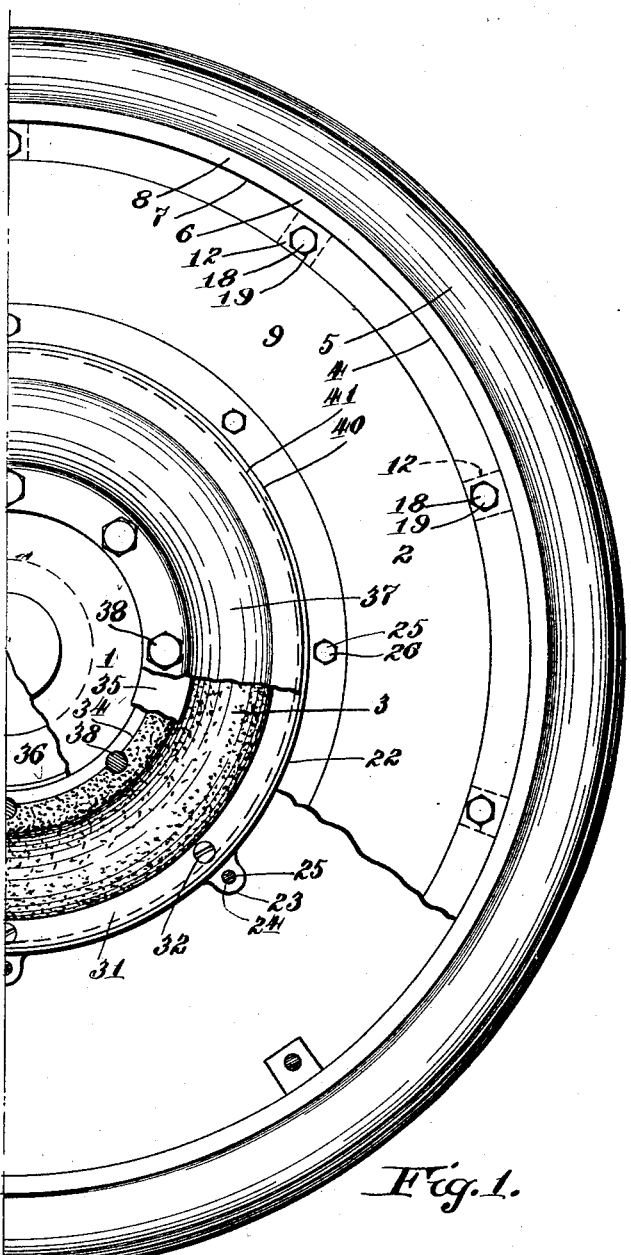

Patented Dec. 2, 1930

1,783,469

UNITED STATES PATENT OFFICE

SCHUYLER C. HATFIELD, OF BALTIMORE, MARYLAND

RESILIENT DISK WHEEL

Application filed May 31, 1922, Serial No. 564,893. Renewed April 24, 1930.

The invention relates to a disk wheel structure of the resilient type. In my previous patents numbered 1,049,300, Dec. 31, 1912; 1,087,903, Feb. 17, 1914; 1,105,654, Aug. 4, 1914; and 1,324,114, Dec. 9, 1919, I have disclosed an elastic wheel consisting of an inner or hub section, an outer or spoke section and means for holding the two sections in the same radial plane, the two sections being formed to provide for a considerable amount of radial play between the sections, which is taken up by a pneumatic pad between the sections providing the resilient feature.

The object of the present invention is to provide a metallic disk construction to take the place of the outer or spoke section doing away with the necessity for wooden spokes and improving the previous structure as to simplicity of detail, cheapness of construction and added convenience as to the knock down or demountable feature.

The resilient wheel with the inner pad makes it possible to use a solid rubber tire under any and all conditions, i. e., with both pleasure cars and trucks and the present device includes means for demountably securing the solid tire and the rim therefor in position which eliminates many of the difficulties incident to the previously existent solid tire practice which involves the use of permanently attached rims and tires, the rims being pressed on making it necessary when the tires are worn out to remove the rims by hydraulic pressure and replace the rims with new or retreaded tires in the same manner.

By means of the present structure this difficult and expensive practice is eliminated, the rims being easily demountable so that they can be changed in any garage or even on the road by the use of an ordinary rim wrench.

In the accompanying drawing I have illustrated a wheel, tire and rim embodying the features of my invention in the preferred form.

In the drawing Figure 1 is a side elevation of the wheel, one-half being removed for convenience of illustration and certain parts being broken away to show the underlying portions;

Figure 2 is a section on the line 2—2 of Figure 1 showing the upper half of the wheel above the center of rotation, the section being on a plane of the axis and at right angles to the plane of Figure 1.

Referring to the drawings by numerals, the wheel as shown consists of an inner or hub section 1, an outer or spoke disk section 2, and an annular pneumatic pad 3 between the sections.

The outer or disk portion 2 is dependent in this instance for its rigidity on the rim 4 which carries a solid or other tire 5. This rim as shown is a channel shaped member, has outwardly concave side walls or flanges 6, the rim being a transversely flat, circular or cylindrical plate turned up at the edges to form the aforesaid side walls or flanges 6, the bottom wall being indicated by reference character 7 and the concavity by reference character 8.

Spoke disk section 2 is formed of annular plates 9 and 10 of an outside diameter to fit within the rim and secured at their peripheries, one to each edge of the rim as shown, being slightly set in to contact with spaced lugs 12 each of which is in the form of a U-shaped member, the cross arm of the U extending transversely of the rim being riveted at 14—14 to the bottom 7 of the channel which forms the rim, the legs of the U which are in fact lugs 16 and 17, projecting inward radially and being apertured to receive bolts 18 parallel to the axis of the wheel, which preferably extend through both lugs from side to side of the wheel, the bolt passing through both plates, which plates are placed outside the lugs, being held by the head 19 of the bolt on one side and the nut 20 on the other.

The plates 9 and 10 are supported at their inner peripheries by a ring 22 which has lugs 23 corresponding to the lugs 16—17 for this purpose. These lugs, however, as shown extend from side to side, being apertured at 24 to receive bolts 25 parallel to the axis of the wheel and extending through both disks which are apertured in alignment with the holes in the lugs for this purpose, the disks being held by the head 26 and the nut 27 of each bolt respectively.

The ring 22 is formed as to its inner periphery for the purpose of receiving and holding the outer bead of the pad 3 with an inner circular rib 29 on one side which is preferably cut under to receive the bead 30 of the pad which latter is held by a clamping ring 31 on the other side, the ring 31 in turn being held by screw bolts 32 which pass through the ring and are seated in the rib 29. The inner bead 34 of the pad is held by tapered rings 35 one on each side of the hub section 36, and these rings in turn are held by the annular plates 37 which hold the hub and outer section in the same radial plane as foresaid providing for a relative radial movement of the two parts. These plates are held at their inner peripheries to the hub section by bolts 38 which pass through the hub section through the rings 35 and through the bead of the tire and of the plates 37, the outer peripheries of the plates at 40 bearing on flat circular surfaces 41 on the outer spoke disk section 2.

To take the wheel down and remove the rim and disks it is only necessary to remove the bolts 18 and 25, releasing the disks or annular plates 9 and 10. To remove the pneumatic pad the bolts 32 and 38 are taken out, releasing the rings 31 and 35 and the plates 37.

The wheel which I have described embodies the application of the elastic wheel principle to a disk wheel structure in a simple, attractive and convenient form. It is also demountable and interchangeable as to all its parts, making it convenient to replace any and all parts which may be worn or mutilated, giving a wheel structure which is of longer life and cheaper to maintain than anything heretofore known.

I have thus described specifically and in detail a single embodiment of my invention in order that the nature and operation of the same may be clearly understood, however the specific terms herein are used descriptively rather than in a limiting sense, the scope of the invention being defined in the claim.

What I claim and desire to secure by Letters Patent is:

An elastic wheel consisting of a hub section and an outer section, spaced from the hub section to provide play in a radial direction, means for confining the play to a radial plane, a pneumatic pad between the sections, the outer section consisting of an inner ring having projecting lugs and a rim having inwardly projecting lugs, and a pair of annular plates, one on each side of the wheel bearing on the rim lugs and on the ring lugs and bolts passing through the lugs and through both plates parallel to the axis securing the plates to the lugs.

Signed by me at Baltimore, Maryland, this 23rd day of May, 1922.

SCHUYLER C. HATFIELD.